L. STRAUSS.
Screw-Bolt.
No. 228,288.                Patented June 1, 1880.
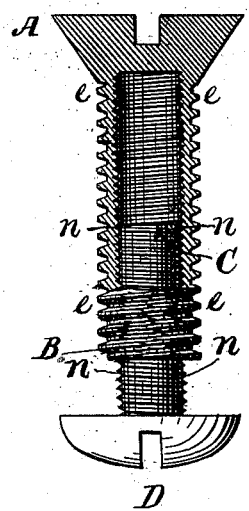
Witnesses:
R. B. Whitman
Wm H. Bates
Leopold Strauss Inventor
by Chas S. Whitman Atty.

UNITED STATES PATENT OFFICE.

LEOPOLD STRAUSS, OF MIDDLETOWN, CONNECTICUT.

SCREW-BOLT.

SPECIFICATION forming part of Letters Patent No. 228,288, dated June 1, 1880.

Application filed February 26, 1880.

*To all whom it may concern:*

Be it known that I, LEOPOLD STRAUSS, of Middletown, Connecticut, have invented a new and useful Improvement in Screw-Bolts, of which the following is a specification.

The object of my invention is to make a screw-bolt that could be fastened in its place so as not to be easily loosened or unscrewed; and it consists of a combination of two screw-bolts, one being the principal or outer bolt and the other the inner or locking bolt. The outer bolt has a right-hand screw-thread on its outer surface. Its lower or pointed end is cylindrical, having a socket a third or half the length of the bolt, or thereabout. Within this socket is a female left-hand screw-thread, to which is fitted the left-hand screw-thread, which extends the whole length of the locking-bolt. The head of this locking-bolt should be larger in diameter than is the outer bolt.

The figure of the drawing illustrates a section of my invention on the line of the axes of the two screw-bolts set together.

A B is the outer screw-bolt, with its right-hand screw-threads $e\ ee\ e$ on its outer surface. $n\ n\ n\ n$ are the left-hand screw-threads of the socket. C D is the smaller or locking bolt, with its left-hand screw-thread fitting $n\ n\ n\ n$. This bolt C D screws into and fits the socket up to its head D.

The operation and use of my invention are as follows: The outer bolt, being made of the required length for the thickness of the materials designed to be bolted together, is screwed home to its place, its head tight up to its side of the materials, while its socket end reaches through just flush with the other side of the materials, or slightly short of it. The smaller bolt is then screwed into its socket as tightly as it will bear, and this completes the work.

Now it is obvious that when the bolts have been thus set any movement tending to unscrew the larger bolt will be resisted by the smaller bolt, because the same turn that should draw out the larger bolt tends to screw its socket farther on to the smaller bolt; but as the smaller bolt has already been screwed into the socket as far as it can go, the larger bolt is virtually locked and held fast by it, and the larger bolt can be removed only by first removing the smaller bolt.

I do not confine myself to a right-hand screw-thread on the outer surface of the larger screw-bolt, nor to a thread over its entire length. It may be for only a part of its length, and it may be a left-hand screw-thread, provided the socket and the smaller bolt have each an opposite or right-hand screw-thread, as it is obvious that the principle of operation and the result would be the same as I have specified hereinbefore.

Now, what I claim, and desire to secure by Letters Patent, is—

The headed screw-bolt D, in combination with the hollow-headed screw-bolt A, as and for the purpose set forth.

LEOPOLD STRAUSS.

Witnesses:
 H. S. RAYMOND,
 ROBERT G. PIKE.